United States Patent Office 3,703,466
Patented Nov. 21, 1972

3,703,466
DIALYSERS AND SPACER FRAMES THEREFOR
Jean Laforest, Saint-Cyr-Au-Mont-D'Or, Rhone, and Pierre Miton, Lyon, Rhone, France, assignors to Rhone-Poulenc S.A., Paris, France
Filed Dec. 7, 1970, Ser. No. 95,694
Claims priority, application France, Dec. 12, 1969, 6943177
Int. Cl. B01d 31/00
U.S. Cl. 210—321　　　　　　　　　　　　　7 Claims

ABSTRACT OF THE DISCLOSURE

A spacer frame for a dialyser and a dialyser including such a frame formed from thin sheets of resilient material. The spacer frames are made up of at least two thin laminal elements having four duct forming orifices therein, and a central cell forming orifice. Extension portions are provided for two of the duct forming orifices in one of a laminal element and extension parts are provided for the cell forming orifice of the other laminal element, the extension parts and portions overlying to provide a communication between the two duct forming orifices and the cell, no one laminal element having a channel extending from a duct forming orifice to a cell forming orifice, thus reducing leakage and pressure loss.

---

This invention relates to spacer frames for dialysers or electrodialysers and to dialysers including such frames.

Dialysers and electrodialysers usually include a stack of alternately placed membranes and spacer frames. The spacer frames are formed of a thin resilient material, and may be stamped out from a sheet. The spacer frames usually include a central aperture which forms, together with the two adjacent membranes, an exchange cell in the dialyser or electrodialyser. Further holes are formed in the frame and in the membranes and these form, within the stack, collector ducts. Communication is provided between selected ones of the collector ducts and the cells by channels which in fact are further cut out portions of the spacer frames.

As the thickness of the spacer frames is generally between 0.4 and 4 mm. attempts have been made in order to achieve sufficient flow rate, to increase the width of the channels as much as possible. The membranes are frequently very thin and flexible and they can deform easily and enter the interior of these channels. Thus, the width which can in practice be used for the channels is limited and the flow cross sections remains low and the pressure drops remain high. If the channels are widened at all, deformation of the membrane in the channels cannot be avoided and the leak proofness of the cells is not certain. Fluids thus escape into the wrong ducts and thus the general efficiency of the dialyser is greatly reduced.

Various means have been proposed to reduce or eliminate these leakages, whilst avoiding excessive pressure drops and excessively complicated procedures.

It is common practice to place within the cell a grid which acts as a spacer to prevent the membranes from buckling or bending into the cells. In one proposal the channels are made wide and the grid extends into these channels. In another proposal the channels are narrow and curved. Both these devices lead to high pressure drops and do not entirely avoid the leakages mentioned above.

In another proposal the channels are either cut in the frames only in a part of their thickness or are hollowed out in an element of the frame covered by a second element. Leakages are effectively eliminated, but at the cost of a very difficult and delicate construction.

According to the present invention there is provided a spacer frame for a dialyser including a plurality of superposed planar laminal elements with a cell forming orifice and four other orifices in one element respectively communicating with a cell forming orifice and four other orifices in another element and the cell forming orifice in said one element additionally communicating with two of said other orifices in said another element.

By making the spacer frame of a number of laminal elements, it is possible to cut out, in a simple production technique, orifices right through each laminal element. When the laminal elements of a particular frame are superposed to form the frame, a communicating path is provided between the various orifices in the desired manner. However, no one laminal element has a channel extending from an orifice which forms a duct to an orifice which forms a cell.

The spacer frame may have more than two laminal elements, for example, three. In this case the first and second elements would be the outer two and the middle element would constitute the means connecting the various orifices which are to be connected and would preferably have seven orifices, five of which would correspond to the five orifices of the other two elements, the other two providing the connection between one orifice of one element and two orifices of the other element.

In a preferred embodiment, however, the spacer frame has only two superposed planar laminal elements, first, second, third and fourth duct forming orifices in each of said elements, cell forming orifices in each of said elements, the orifices of one element respectively overlying only the orifice of the other element, two different numbered ones of the orifices of the group comprising the third and fourth orifices of the two elements each being provided with an extension portion, and two extension parts being provided in the orifices selected from the group comprising of the first and second cell forming orifices, the extension parts each partly overlying an extension portion, whereby the third and fourth orifices are in communication with the cell forming orifice.

According to the second aspect of the present invention there is provided a dialyser or electrodialyser including spacer frames according to the invention stacked with alternate spacer frames reversed.

In order that the invention may more readily be understood, the following description is given, merely by way of example, reference being made to the accompanying drawings, in which.

Figure 1:
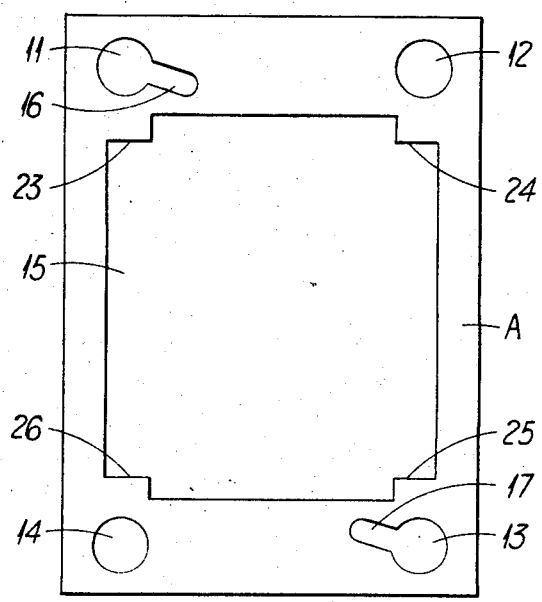
FIG. 1 is an elevation of one embodiment of the second of two laminal elements forming a frame of the invention.

Spacer frames according to the invention consists of at least two planar laminal elements. In the embodiments illustrated in the drawings, there are in fact only two laminal elements, referred to hereinafter as first and second laminal elements.

As shown in FIG. 1, the second laminal element A is rectangular and is provided with a central cell forming orifice 15 which is substantially rectangular and symmetrically situated with respect to the laminal element as a whole. Four other duct forming orifices 11, 12, 13 and 14 are situated near the corners of the central duct forming orifice 15, two of the diagonally opposite orifices 12 and 14 being circular. The other two diagonally opposite orifices 11 and 13 have similar circular parts and also extension portions 16 and 17 leading from the circular part substantially in the direction of, but not reaching, the central duct forming orifice 15. Shoulders 23, 24, 25 and 26 are formed on the central orifice to support a grid as will be described later.

Figure 2:
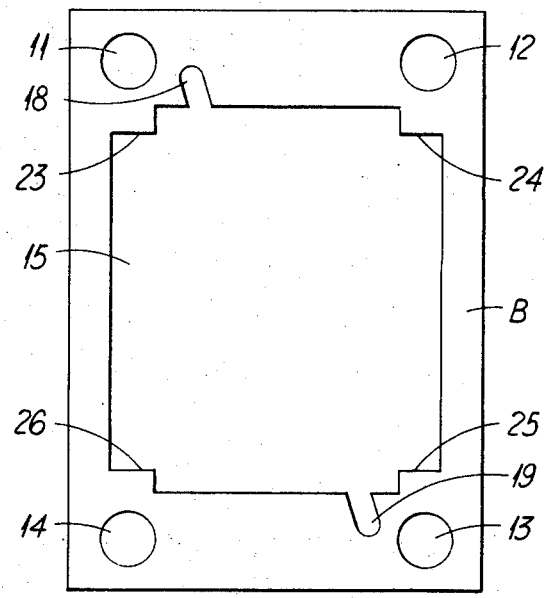
FIG. 2 is a similar view of the corresponding first of said two laminal elements.

As shown in FIG. 2, the first laminal element B is similar to the second laminal element A, except that the four duct forming orifices 11, 12, 13 and 14 are all circular, and the central cell forming orifice 15 has extension parts 18, 19 leading off in the direction of the two diagonally opposite orifices 11 and 13, but not reaching these orifices.

Figure 3:
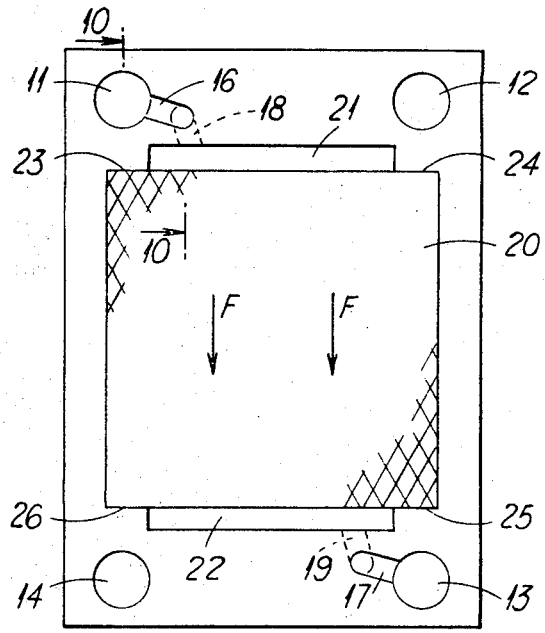
FIG. 3 is a similar view of the spacer frame formed by superposition of the two laminal elements shown in FIGS. 1 and 2.

When the two laminal elements A and B are superposed, the extension portions 16 and 17 of the two diagonally opposite orifices 11 and 13 in the second laminal element, partly overlie the extension parts 18 and 19 of the central duct forming orifice 15 of the first laminal element, as shown in FIG. 3. The other two sets of diagonally opposite orifices 12 and 14 coincide and the two central cell forming orifices coincide. A grid 20 is provided in the central cell forming orifice and the grid and the central orifices are such as to leave distribution zones 21 and 22.

It will be noted that the central orifice 15 itself, excluding the extension parts, is symmetrical about a vertical line which passes exactly between the orifices 11 and 14 and the orifices 12 and 13. Thus, if a frame made up of the two elements is placed in reverse, that is to say face-over-face relation, to a second frame, then the cell forming orifices themselves will overlie and the duct forming orifices will overlie. To form a dialyser for electrodialyser the frames are stacked in this manner, i.e. with alternate spacer frames in reversed or face-over-face relation and membranes 27 are stacked between adjacent pairs of spacer elements. Cells are thus formed by the membranes and the orifices 15 and the membranes are provided with four orifices in alignment with the four orifices 11, 12, 13 and 14 so that four ducts are formed through the stack.

The distribution zones are preferably symmetrical and rectangular the length advantageously being between 70 and 90% of the transverse side of the frame and their width between 1 and 15 mm. or preferably between 2 and 8 mm., so that the membranes do not tend to sag significantly.

In operation, liquid to be diluted is introduced into the ducts formed by the orifices 11 and removed from the ducts formed by the orifices 13. Liquid to be concentrated is introduced into the ducts formed by the orifices 12 and removed from the ducts formed by the orifices 14. Of course, the flow may, if desired, be in the opposite direction in either path. It will be appreciated that communication is provided between the ducts and the cells by the extension of portions 16 and 17 and the extension parts 18 and 19. Thus, no channel extends right through a spacer frame. The communication is in fact provided by a path including both of the laminal elements of a frame. Thus, a reduction in the tendency of a membrane to buckle is achieved and therefore leakage is reduced.

Figure 10:
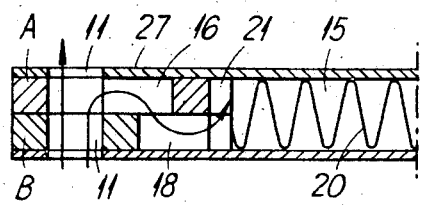
FIG. 10 is a scrap section through a spacer frame and two membrances, the section being taken along the line 10—10 illustrated in FIG. 3, and showing the directional flow of liquid.
Figure 11:
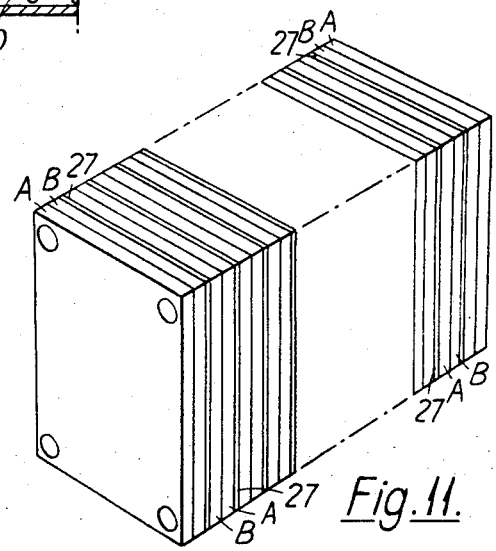
FIG. 11 is a perspective view, elongated for clarity, of a dialyser made up of a stack of membranes and spacer frames according to the invention.

It will be appreciated that the spacer frames 20 keep the membranes spaced apart in the cells. The distribution zones 21 and 22 enable the liquid flowing to or from the extension parts 18 and 19 to the respective ducts to be distributed evenly with respect to the cell. The grid also serves to distribute the liquid over the entire surface of the cell in contact with membrane. The general direction of flow is indicated by the arrows F in FIG. 10.

Figure 4:
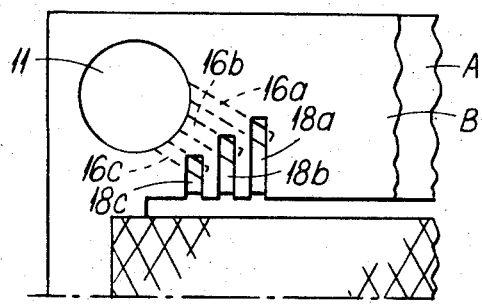
FIGS. 4, 5, 6, 7, 8 and 9 are similar views of different embodiments of spacer frame according to the invention.
Figure 5:
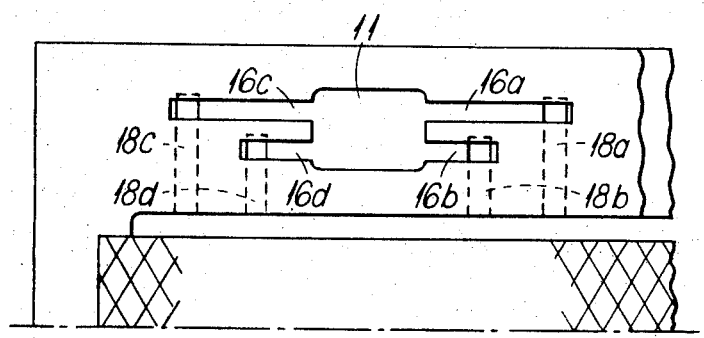

FIGS. 4 and 5 show preferred arrangements of the orifices and extension portions and parts which form channels between the ducts and cells. FIG. 4 shows that it is possible easily to arrange in parallel several channels such as 16a, 16b and 16c, as well as 18a, 18b and 18c. These channels can be of unequal lengths and can intersect at various angles. In total, they provide a greater flow cross-section, all other things being equal, than the conventional channels cut in the thickness of the frame. It should be noted that it would not be possible to cut several channels in parallel, which would connect the orifices with the central aperture, in the total thickness of a spacer frame of a known type, because the elements which separate these channels would not be held firmly by the frames. A preferred device consists of providing (FIG. 5) several channels in parallel, arranged symmetrically on either side of the orifice 11. These channels intersect, for example at a right angle, with each of the corresponding channels which open into the central orifice. These arrangements are particularly advantageous for apparatuses with high flow rates or low pressure drops.

The frames according to the invention allow the membranes to be supported continuously around the orifices of the collectors and between the central aperture and these orifices, thus for practical purposes preventing any possibility of leakage from a concentration zone to a dilution zone and vice versa. As a result, it is possible to accept wider channels than if they were to join the orifice of the collector directly to the central orifice over the entire thickness of the spacer frame, and it is unnecessary to provide a very tortuous path for the channel. Since, furthermore, the channels can easily be multiplied, a reduction in the pressure drops is achieved relative to the systems of channels of known types. The cutting of the channels is an easy operation which is generally effected simultaneously with cutting the duct and cell forming orifices. A device of the punch type can be used.

The superposition of the elements and membranes so as to form cells is effected in the conventional manner, with the aid of any means of centering usually employed, such as centering pins, fitting devices, guide bars and the like. The centering of these various components is entirely necessary to form the collectors. The assembly of the elements is a simple operation which can be effected by gluing, heat-sealing or the like or, more frequently, by simple superposition and clamping one element against the other.

A chemically inert plastic which is a non-conductor of electricity is preferably used as the materials forming the elements of types A and B. Supple or semi-rigid materials, such as plasticised or unplasticised polyvinyl chloride, polystyrene, high density polyethylene, natural or synthetic rubbers, polyester, polyamide or polyurethane resins, or equivalent materials, can be employed.

The distribution zones allow a fluid introduced into the cell to distribute itself rapidly, without encountering an obstacle, over the entire useful width of the cell. The fluid can thus sweep over the entire useful surface of the cell, without leaving a zone of lesser flow or even a dead zone, right up to the opposite end. There, without encountering an obstacle the fluid reaches the orifices of the outlet channels. This arrangement, combined with that of the channels described above, further reduces the pressure drops in the feed circuits and outlet circuits of the cells of the apparatus and allows the exchange efficiency to be significantly increased. Furthermore, it makes the multiplication of collectors in large-scale industrial apparatuses superfluous. It thus contributes to simplifying the construction and operation of the industrial apparatuses.

Figure 6:
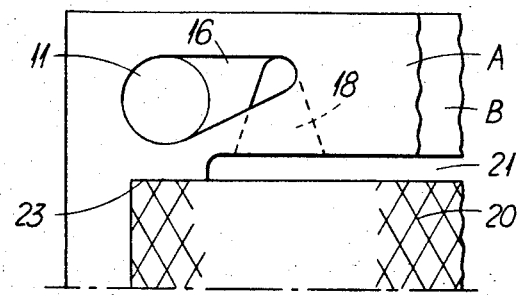
Figure 7:
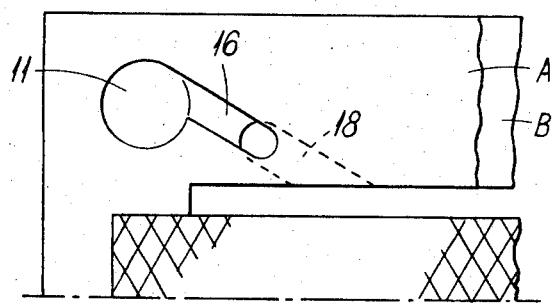
Figure 8:
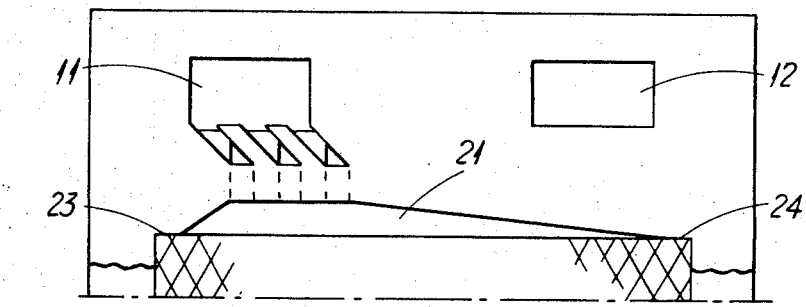
Figure 9:
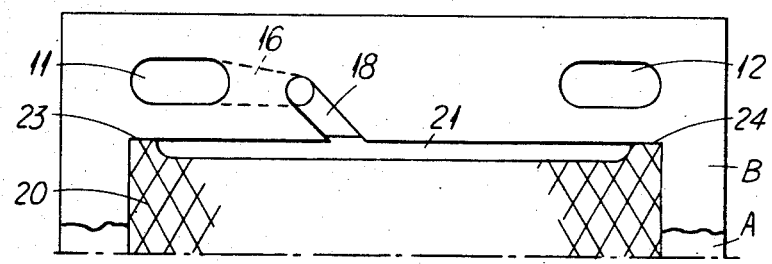

Other forms of spacer frames according to the invention are illustrated in FIGS. 6 to 9. Thus FIG. 6 shows channels 16 and 18 of variable widths. In effect, the channels can be made of various shapes which allow pressure drops to be further reduced, for example through continuous transitions in cross-section. FIG. 7 shows a channel 16 tangential to the orifice 11 of the collector and a channel 18 located in the extension of the channel 16. These channels are inclined relative to the axes of symmetry of the frames. FIG. 8 shows a series of three channels arranged in parallel, and of the same length. These channels open onto a distribution zone of variable width, so as to form flow cross-sections substantially proportional to the flow rates. FIG. 9 shows a distribution zone 21 consisting of the recess of the grid 20. The grid rests against the ends 23 and 24 of the internal transverse edge of the frame, and against the internal longitudinal edges.

While in the various embodiments illustrated two extension portions 16 and 17 have been illustrated in one element and two extension parts 18 and 19 in the other element, it is equally possible to provide one extension portion 16 and one extension part 18 in the diagonally opposite zone of the same element with the other element obviously showing the converse arrangement. With this arrangement the two elements making up a frame can be identical. To form a frame one of the elements is rotated by 180° with respect to the other element about a central axis perpendicular to the plane of the elements.

The invention is very particularly applicable to electrodialysis apparatuses, regardless of their uses. It is of course also applicable to dialysis apparatuses.

EXAMPLE 1

A multicellular electrodialyser is equipped with frames according to the invention, the general arrangements of which are as in FIG. 3, but the channels are as shown in FIG. 4. Each spacer frame is made up by simple superposition of two elements of types A and B. Each element is made of high pressure polyethylene. The external dimensions are 224 x 680 x 0.5 mm. The central duct forming orifice is 170 x 544 mm., plus the distribution zones, which are each 4 mm. wide and 154 mm. long. The frame possesses four diagonally opposite orifices of 28 mm. diameter. The channels have a constant width of 3 mm. and each consist of two sets of three sections of average lengths 15 mm., the sets intersecting at an angle of 45°. The channels of element B open onto distribution zones which are devoid of a grid. The grid, of area 170 x 544 mm., consists of two webs of polyethylene filaments of diameter 0.60 mm., intersecting 60° at intervals of 1.8 mm., and heat-sealed so as to reduce the thickness to 1.0 mm. The grid is kept in place by the shoulders which define the distribution zone.

The membranes, which are 0.32 mm. thick, have a bursting strength of 6 kg./mm.$^2$ and a modulus of elasticity of 150 kg. per cm.$^2$, at 10% elongation.

The electrodialyser, equipped in this way with 20 exchange cells, is subjected to two simultaneous flows, circulating at a temperature of 20° C.:

(a) A flow of pure water which passes through each cell at a flow rate of 50 l./hour, with a pressure drop of 850 mbars and (b) A flow of an aqueous solution, coloured with Congo red, at the rate of 0.5 g./l.

A pressure of 870 mbars is applied to the electrodialyser for a flow rate of 52 l./hour, giving a pressure difference of 20 mbars between adjacent cells. Possible leakages of the coloured solution into the water are determined by colorimetric measurement. In the apparatus built up in this way, the clamping force between the plates being 7 tons, no leakage whatsoever is detected after 2 hours uninterrupted operation.

By way of comparison, an apparatus of a known type is used, with frames of the same general dimensions, formed with orifices of the same dimensions, equipped with the same membranes and with grids of the same type. The spacer frames are made in one piece and have the same thickness (1 mm.). The channels between the duct forming orifices and the cell forming orifices are formed by cutting through the entire thickness of the frame, the channels having a right angle bend therein, as is conventional.

(a) With channels of 3 mm. width the pressure drop caused by each cell is 1000 mbars for a water flow rate of 50 l./hour (as against 850).

(b) With channels of 3.2 mm. width the pressure drop is 900 mbars for a water flow rate of 50 l./hour and additionally a leakage of 10 cm.$^3$/hour/cell arises, with a pressure difference of 20 mbars between two adjacent cells.

EXAMPLE 2

An electrodialyser of large dimensions (grid 370 x 1080 mm.) is used. Each frame is equipped with two sets of 4 channels of 3 mm. constant width. The channels and orifices are as shown in FIG. 5.

A flow of pure water passes through each cell at a flow rate of 105 l./hour and a pressure drop of 1200 mbars, and a flow of aqueous solution coloured with Congo red is also passed through. With a pressure of 1250 mbars applied to the coloured solution, no leakage whatsoever is detected after 4 hours operation.

By way of comparison, an apparatus of the same dimensions, in which the frames are equipped at each end, with a channel bent at a right angle and cut into the total thickness of the frame, shows the following behaviour:

(a) A channel of 6 mm. width: considerable leakages.

(b) A channel of 3 mm. width: For a water flow rate of 105 l./hour, the pressure drop of one cell is greater than 2500 mbars.

(c) With two orifices for the feed of liquid, and two orifices for the removal of liquid, in each cell, and with a channel of 3.2 mm. width for each orifice, a leakage of 20 cm.$^3$/hour per cell is detected with a difference of 50 mbars between the two adjacent cells. This arrangement furthermore demands a complicated manufacture and assembly of the apparatus.

We claim:

1. A spacer frame for a dialyser comprising in combination:

(a) a first planar laminal element having an axes of symmetry;

(b) means for defining a first cell forming orifice in said first element;

(c) means for defining first, second, third and fourth duct forming orifices passing through said first element and arranged symmetrically about said axes of symmetry;

(d) a second planar laminal element having axes of symmetry superposed on said first element;

(e) means for defining a second cell forming orifice in said second element exactly overlying only said first cell forming orifice of said first element;

(f) means for defining said first, second, third and fourth duct forming orifices passing entirely through said second laminal element and each respectively exactly overlying only said first, second, third and fourth orifices of said first element to form un obstructed first, second, third and fourth ducts;

(g) means for defining an extension channel portion extending through a thickness of said first element and forming extensions to said first and third orifices thereof only, such channel portions extending to a location short of an edge of said first cell forming orifice; and (h) means for defining two channel extension portions to said cell forming orifices of said second element, said extension portions extending to a location short of said duct forming orifices and each overlying an extension portion of said first and third channel extension portion of said first element, effective to provide communication between said first and third ducts of said first and second elements and said first and second cell forming orifices.

2. A spacer frame as defined in claim 1, further comprising means to support a grid in said cell forming orifices.

3. A spacer frame as defined in claim 1 wherein said cell forming orifice in said first laminal element and said cell forming orifice in said second laminal element define shoulders effective to support a grid in said orifices.

4. A spacer frame as defined in claim 3 and further comprising a grid suported by said shoulders.

5. A spaced frame as defined in claim 4, wherein said grid comprises a polyethylene web.

6. A spacer frame according to claim 4 wherein said grid and said cell forming orifices in each element define distribution zones connected to said third and fourth orifices.

7. A dialyser comprising a stack of membranes, means for defining four orifices in each said membrane, a spacer frame located between each adjacent pair of membranes, each spacer frame comprising, in combination:
 (a) a first planar laminal element having axes of symmetry;
 (b) means for defining a first cell forming orifice in said first element;
 (c) means for defining first, second, third and fourth duct forming orifices passing through said first element and arranged symmetrically of said axes of symmetry;
 (d) a second planar laminal element having axes of symmetry superposed on said first element;
 (e) means for defining a second cell forming orifice in said second element exactly overlying only said first cell forming orifice of said first element;
 (f) means for defining said first, second, third and fourth duct forming orifices passing entirely through said second laminal element and each respectively exactly overlying only said first, second, third and fourth orifices of said first element to form unobstructed first, second, third and fourth ducts;
 (g) means for defining an extension channel portion extending through a thickness of said first element and forming extensions to said first and third orifices thereof only, such channel portions extending to a location short of an edge of said first cell forming orifice; and
 (h) means for defining two channel extension portions to said cell forming orifices of said second element, said extension portions extending to a location short of said duct forming orifices and each overlying an extension portion of said first and third channel extension portion of said first element, effective to provide communication between said first and third ducts of said first and second elements and said first and second cell forming orifices, said spacer frames being mutually congruent and stacked alternately in reversed face over face relation, whereby four ducts are formed by said first, second, third and fourth orifices, and said four orifices in said membranes, and said cell forming orifices being in overlying relation.

References Cited
UNITED STATES PATENTS

| | | | |
|---|---|---|---|
| 3,223,612 | 12/1965 | Chen et al. | 204—301 |
| 3,201,339 | 8/1965 | Tsunoda et al. | 204—301 |
| 3,271,242 | 9/1966 | Kollsman | 204—301 X |
| 3,284,335 | 11/1966 | Tsunoda et al. | 204—301 |

FRANK A. SPEAR, Jr., Primary Examiner